United States Patent Office 2,957,207
Patented Oct. 25, 1960

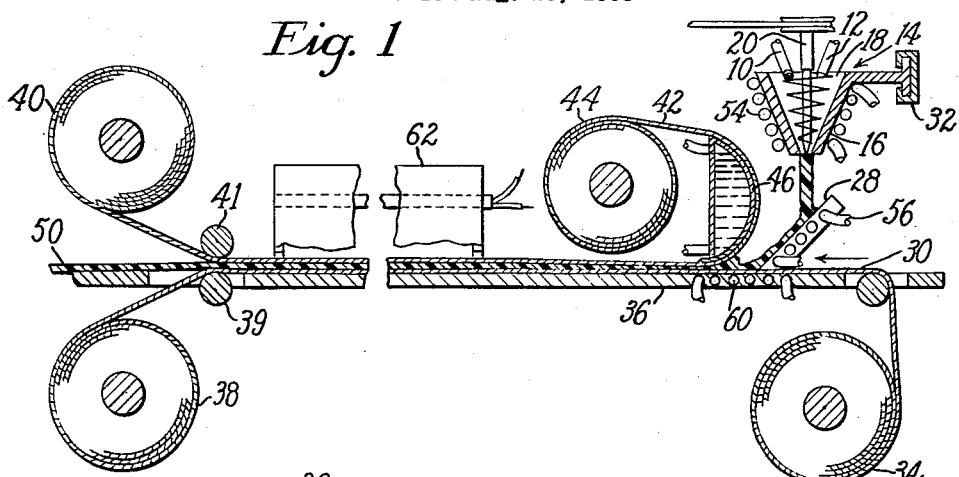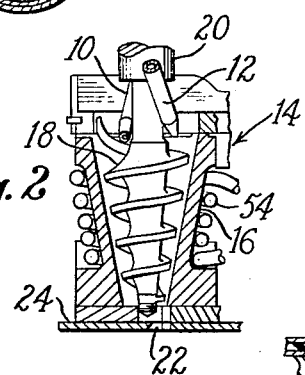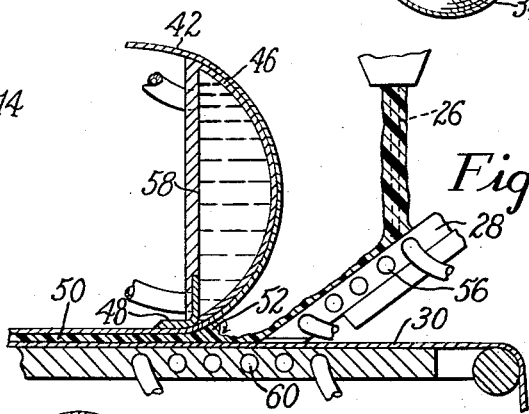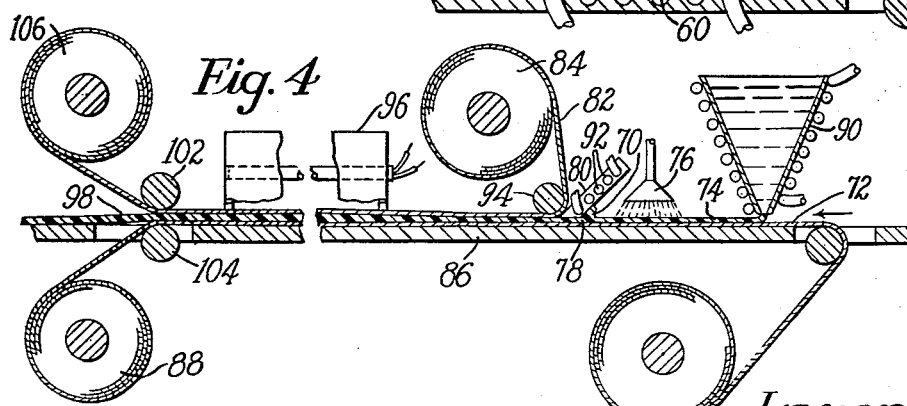

2,957,207

MANUFACTURE OF THIN SHEET FOAM

Cyril W. Roop, Reading, and Conrad Rossitto, Lawrence, Mass., and Adolph M. Chaplick, Hudson, N.H., assignors to B.B. Chemical Co., Boston, Mass., a corporation of Massachusetts Filed Aug. 28, 1958, Ser. No. 757,717

7 Claims. (Cl. 18—57)

This invention relates to the manufacture of thin cellular polyurethane resin sheets.

Because of the desirable properties of polyurethane resin foam it is possible to use very thin layers of this cellular material to achieve characteristics previously requiring much thicker layers of material. In general these thin cellular sheets of resin have been made by slicing thick slabs of the foamed material to the desired dimensions.

In the copending application of Cyril W. Roop and Stephen E. Urban, Serial No. 663,786, filed June 5, 1957, entitled "Casting of Thin Cellular Resin Sheets," there is disclosed a continuous process of casting thin cellular polyurethane resin sheets. The process as there disclosed involves depositing a chilled reaction mixture on a casting surface, the temperature of the resin mixture being maintained below the temperature at which the reaction to develop gas will proceed at a significant rate. A light impervious cover sheet or "blow sheet" is laid down on and in wetting contact with a layer of resin before foaming commences. Thereafter the temperature of the mix is increased to cause development of gas, expansion of the layer and uniform curing of the resin. The cover or blow sheet is believed to prevent escape of minute quantities of water vapor and catalyst as well as the blowing gas, and this retained water vapor and catalyst insure that the reaction goes to completion from surface to surface of the layer.

While the process as disclosed is satisfactory in general, some difficulty is encountered in mixing the reactive components to the optimum extent and in deposition and spreading of the material.

It is a feature of the present invention to provide an improved process for manufacturing thin cellular polyurethane resin sheets including a novel mixing procedure affording greater control over the degree of mixing. It is a further feature of the invention to provide a process for forming thin cellular polyurethane resin sheets including novel mixing, depositing and spreading procedure insuring the formation of resin sheets of optimum uniformity.

We have now found that mixing in the manufacture of cellular polyurethane resin sheets is most effectively and uniformly achieved as a continuous process by bringing together reactive components at low temperature in a first mixing zone and subjecting them to a rough preliminary mixing to an extent short of that desirable for their interaction to form a foamed body. The chilled roughly mixed reagents are then carried on a casting surface to an inclined spreading and mixing surface disposed at an angle to the casting surface to provide with the casting surface a path of diminishing cross section in the direction of movement of the casting surface. Portions of the rough intermixture collect between the spreading surface and the casting surface as a rolling bank in which freshly deposited material and material previously accumulated between the spreading surface and the casting surface are subjected to mixing.

It has also been found important to introduce a limited delay between the time of preliminary intermixture and the entry of the intermixture into the rolling bank. In a preferred form the roughly mixed materials are conducted along flow directing surfaces which lead the undermixed material without appreciable free drop from the point of discharge from the initial mixer to the casting surface.

A light impervious cover or blow sheet is disposed in free floating relationship, i.e. capable of unrestrained movement in a vertical direction, on the upper surface of the resin mixture. This cover or blow sheet may be laid down on the layer of resin after the casting surface has passed a spreading and mixing surface. Preferably, however, the blow sheet is passed along a chilled guide surface in a path sloping toward the casting surface so that the blow sheet is the actual spreading and mixing surface; and the rolling bank of material is formed between the casting and blow sheets. The temperature of the resin mixture is raised after the cover sheet is laid on. Heat penetrates the thin layer uniformly so that uniform development of gas and expansion of the resin layer occurs and the resin becomes firm and cures uniformly.

The invention will be described further in connection with the drawings forming part of the disclosure of the invention, in which, Fig. 1 is a diagrammatic elevational view in cross section, with parts broken away, of one arrangement of apparatus for practicing the method of the present invention;

Fig. 2 is a fractional elevational view, on a larger scale and with parts broken away, of the mixing head used in the apparatus of Fig. 1;

Fig. 3 is a fractional view, on a larger scale and with parts broken away, of the spreading and mixing device of the apparatus of Fig. 1; and Fig. 4 is a diagrammatic elevational view, with parts broken away, of a second arrangement of apparatus for practicing another form of the method of the present invention.

For convenience the method will be described first as it is practiced using apparatus shown generally in Fig. 1 and described in more detail in the copending application of Hans C. Paulsen et al., Serial No. 757,716, filed August 28, 1958, entitled Apparatus for Producing Plastic Sheeting. This apparatus is constructed and arranged so that the various steps of the method may be performed in controlled and timed relation. It will be understood, however, that the method is not restricted to practice with such apparatus but may be carried out by hand.

As illustrated in the drawing, see Fig. 1, components such as a prepolymer and a catalyst-water mixture are chilled and fed through the pipes 10 and 12 in predetermined ratio to a mixer 14. In the mixer 14 the components enter a frusto-conical mixing bowl 16 in which they are subjected to the action of a frusto-conical mixing head or rotor 18 of the auger type mounted on a vertical drive shaft 20. In this mixer the components are rapidly blended and are discharged through an orifice 22 controlled by a valve 24. The speed of the rotor 18, the rate of supply of the components to the mixer, and the rate of discharge from the mixer 14 are controlled by appropriate setting of the machine so that the mixing is less than that which would be optimum for resin foam formation. The undermixed material from the orifice 22 passes to and surrounds a rod 26 mounted for travel with the mixer 14. The material flows down the rod 26 to a cooled flow plate 28 slightly spaced from the lower end of the rod 26 and passes from the flow plate 28 to a casting surface 30 slightly spaced from the lower edge of the flow plate. Due to the viscosity of the material, contact of the stream of mixed material with the rod 26 substantially retards the speed of downward movement of the mixed material. The mixer 14, its associated operating mechanism and the rod 26 are mounted on a rail 32 for movement of translation parallel to the surface of the flow plate 28 and casting surface 30.

The casting surface 30 in the illustrated apparatus may be a a sheet of "release" paper, e.g. a smooth surfaced silicone treated paper, which is fed from a roll 34 mounted at one end of a long table 36 and caused to travel the length of the table by the driven take up roll 38 at the egress end of table 36 which pulls the casting sheet around roller 39 away from the resin layer 50 and winds it up. The driven take up roll 40 pulls the upper sheet of release paper, i.e. the "blow sheet" 42, around roller 41 and away from resin layer 50 and moves the blow sheet 42 in unison with the casting surface 30 along the length of the table 36.

The blow sheet 42 is fed from a roll 44 suitably mounted above the table and offset in the direction of feed of the casting surface 30 from the path traversed by the mixer 14. From the roll 44 the blow sheet 42 passes around a chilled rounded guide member 46 and beneath a doctor bar 48 at the lower edge of the guide member which determines the line of closest approach of the blow sheet 42 to the casting surface 30 and hence the thickness of the layer of material carried past this line. The surfaces of the casting surface 30 and of the blow sheet 42 as it conforms to the guide member 46 and doctor bar 48 define a path or throat diminishing in cross section in the direction of movement of the casting surface 30 and blow sheet 42.

Mixed material deposited on the casting surface 30 is carried to this path and is reduced to a layer 50 of uniform thickness between the casting surface 30 and blow sheet 42. Portions of the material accumulate in the narrower portions of the path as a rolling bank 52 which insures that there is sufficient of the material on all widthwise portions of the casting surface 30 to form a continuous, uniform layer. The rolling bank 52 includes portions of material accumulated from early portions passing through the throat and also freshly deposited material from portions of the casting surface presently at the throat. Substantial mixing and blending occurs in this rolling bank 52.

It has been found important in the method of the present invention to interpose a time delay between the primary mixing or combining in the mixer 14 and the mixing which occurs in the rolling bank 52. Resin layers mixed and spread without allowing time delay after mixing were found to have foamed unevenly. In the operation of the illustrated apparatus, this delay is introduced by the retarded rate of flow of the mixed material down the rod 26 and down the flow plate 28. The rod 26 and flow plate 28 also lead the resin mixture without free fall from the mixer orifice 22 to the casting surface 30.

Resin foam forming components useful in the process of the present invention include a wide range of materials known per se for reaction to form polyurethane foams. Polyurethane foams are formed from reaction products of a di- or polyisocyanate and materials having more than one active hydrogen. The preferred reactive compositions for use in the present method are mixtures of a prepolymer prepared by reaction of a di- or polyisocyanate and material having two or more active hydrogen atoms such as a polyester, polyester amide, a glycol or an ether glycol, a gas forming material, usually water, and catalyst. Useful isocyanate materials include toluene diisocyanate, metaphenylene diisocyanate, metatolylene diisocyanate 3,3, bitolylene 4,4 diisocyanate, paraphenylene diisocyanate, 1 chloro 2,4 phenylene diisocyanate 3,3 dimethyl 4,4 diphenyl diisocyanate. For reaction with the isocyanate material, many materials having two or more active hydrogen atoms may be used. For example, as disclosed in the prior art polyesters, polyesteramides, polyalkylene glycols, polyoxyalkylene glycols and natural products such as castor oil and its derivatives having reactive, preferably terminal, hydroxyl groups or carboxyl groups may be reatced with the di- or polyisocyanate. The di- or polyisocyanate is employed in amount more than sufficient to provide —NCO groups for reaction with all the active hydrogen atoms and the partial reaction products of prepolymers will contain —NCO groups for subsequent gas forming and cross linking reaction. In general the mixture should be compounded to provide at least about 1.2 —NCO groups to each active hydrogen group and the preferred range is from 2:1 to 10:1. The partial reaction products are mixed with water and catalyst such as organic, preferably tertiary, amines, or other alkaline materials. The mixtures are fluid compositions having desirable viscosity characteristics for spreading at temperatures sufficiently low that reaction to produce gas does not proceed at a significant rate and are foamable at room temperature or above.

It is believed that the uneven foaming of such mixtures in the absence of a time delay is due at least in part to the nature of the resin forming and foaming reaction. The reaction of the components to form a resin foam apparently takes place in stages. Immediately on mixing, the viscosity of the mixture is lower than that of the prepolymer alone. After a short time, e.g. a matter of seconds, there is an increase in viscosity without substantial evolution of gas, i.e. a prefoaming stage observable as a certain milkiness or opacity of the reaction mixture, and this increase in viscosity apparently is important in providing ability of the resinous material to hold the foaming gases. Intermixture of material already in the bank which has had an opportunity for some progress in the reaction with fresh material which has not had opportunity for progress of the reaction to the more viscous prefoaming stage gives a composition with irregular foaming gas holding ability and results in uneven foaming.

It also appears that even in the prefoaming stage the reaction mixture is sensitive to shock. That is, if the material from the primary mixing is allowed to fall freely on the casting surface, irregularities develop in the foam, the location and character of the irregularities following the path of contact of the material from the mixer on the casting surface. These irregularities might be compensated for or covered up in casting a thick slab, but may be sufficient to ruin or sharply reduce the value of a thin sheet of foam.

The extent of mixing of the reactive components is also important, less satisfactory foam being obtained both when the reagents are not mixed well enough and when the reagents are overmixed. The present process takes account of the mixing action which takes place in the rolling bank before the spreading blade and adjusts the extent of primary or rough mixing of the reagents so that the total mixing is neither too little nor too great. The rolling bank 52 must be maintained at approximately ¼" to ¾" in order to maintain a suitable continuity of flow of the mixture and in order that the entire rolling bank may be maintained by cooling means hereinafter described at a temperature low enough to inhibit gasification by activation of the blowing agent in the outermost portion of the rolling bank. In the illustrated organization the depth of the rolling bank may be varied by one or more of the following adjustments, namely, increasing or reducing the speed of movement of the casting sheet 30, adjusting the position or the inclination of the flow plate and volumetric adjustment of the flow of fluid from the mixing bowl. During its flow from the mixing bowl to the throat, the fluid is maintained at a temperature of about 35° F. by refrigerant passing through suitable cooling tubes or channels 54, 56, 58, and 60, respectively applied to the mixing bowl 16, the flow plate 28, the curved guide member 46 supporting the doctor bar 48 and the receiving end portion of the table 36.

In order to accelerate the curing of the plastic sheet, a suitable heating chamber or oven 62 extends along the greater part of the length of the table 36, the ingress end portion thereof being located a substantial distance from the doctor bar 48 and substantially adjacent to the point at which the activation of the blowing agent commences.

In another form of the present invention (see Fig. 4), the major mixing action is that in the rolling bank 70 in the spreading operation. The foaming and curing reaction of a polyurethane foam system such as the prepolymer, water and catalyst system does not take place until all three components are combined. Mixtures of prepolymer and a catalyst such as an amine or of prepolymer and water react very slowly; and a mixture of the catalyst and water does not react at all. As shown in Fig. 4, prepolymer or a mixture of prepolymer and catalyst, or prepolymer and water may be deposited on a casting surface 72 as a thin layer 74 and the remaining component or components needed for the foam forming reaction sprayed from a nozzle 76 on the surface of the layer 74. The material is spread as a thin uniform coating on the casting surface 72 by a chilled spreader knife 80 operated so as to build up and maintain a small rolling bank 70 before it, in which the reactive components are thoroughly mixed. A blow sheet 82 is laid down on the mixed material and the material allowed to become warm and to undergo blowing and curing.

Numerous variations of this process are possible. In the form shown in Fig. 4 the casting surface 72 is a sheet of release paper which is fed from a roll 84 mounted at one end of a long table 86 and caused to travel the length of the table by the driven take up roll 88 in the egress end of the table. The casting sheet passes beneath a chilled spreading receptacle 90 which deposits a layer 74 of prepolymer, prepolymer and catalyst, or prepolymer and water on the casting sheet. This material is carried forward beneath a spray nozzle 76 which delivers a metered amount of either water, catalyst, or mixed water and catalyst, as required, on the surface of the layer 74. Desirably, a high atomizing pressure is used to cause at least limited penetration of the layer 74 to provide a rough mixture. The combined layer of prepolymer, water and catalyst is carried forward to the spreader knife 80 which is cooled by refrigerant passing through the channels and forms a rolling bank 70 between the spreader knife 80 and the casting surface 72. Relative movement of the parts of the rolling bank produces a fine intermixture of the reactive components, premature blowing or foam development being prevented by the cooling effect of the chilled spreader knife 80 on the mixture of reactants. The casting sheet 72 carries a layer 78 of uniform thickness of the mixed reactants beneath the lower edge of the spreader knife 80 and directly thereafter a blow sheet 82 is laid down on the mixture. The blow sheet 82 is fed from a roll 84 mounted above the table 86 and offset in the direction of feed of the casting sheet from the spreader knife. Next the blow sheet 82 passes around the roller 94 and is laid down gently on the surface of the layer 78 of reactive mixture. The casting sheet 72, layer 78 of reactive materials and blow sheet 82 are passed through a suitable heating chamber or oven 96 which extends along the greater part of the length of the table 86. In the heating chamber the reactive materials combine to develop blowing gas which expands the film to a uniformly expanded layer 98 and the layer cures in its expanded state. After curing, the blow sheet 82 and casting sheet 72 are pulled away from the expanded resin sheet around the rollers 102 and 104, respectively, and the blow sheet and casting sheet are wound up on the rolls 106 and 88 for reuse.

While the foregoing description of processes according to the present invention has been described in connection with a particular mechanical apparatus, it will be understood that other apparatus may be used or that the process may be carried out by hand. For example, a layer of part of the reactive mix, e.g. prepolymer and catalyst, may be spread on a stationary casting surface, and the remaining component or components, e.g. water, may be sprayed on the surface of the layer. A spatula or other hand-held knife may then be moved across the surface of the layer in spaced relation to the casting surface to build up before it a rolling bank in which the prepolymer, catalyst and water are mixed. Thereafter a blow sheet may be laid down on the mixed material and the mixture allowed to blow and cure.

The invention will be described further in connection with the following examples. It will be understood that the invention is not limited to the materials, conditions or other details of the examples.

*Example I*

95 parts by weight of an 80:20 mixture of the 2,4 and 2,6 isomers of tolylene diisocyanate were placed in a reaction vessel. To the tolylene diisocyanate there were added 450 parts by weight of polypropylene glycol having an average molecular weight of 2,000. The materials reacted with evolution of heat, and mixing was continued until a temperature peak was reached and then dropped back about 5° C., at which time the mixture was heated with stirring to 140° C. and analyzed for —NCO content. Additional tolylene diisocyanate to the extent of 80 parts by weight was added with stirring to bring the free —NCO group content up to about 9.5%. To the resultant mixture three parts by weight of a fluid silicone oil of 50 centistokes at 25° C. viscosity were added and mixed in. The resultant batch weight was about 627 parts by weight. The resultant mixture was cooled to about 35° F. and kept at this temperature.

Into 24.6 parts by weight of water there were added 12.5 parts by weight of N-methylmorpholine and 6 parts by weight of triethylamine.

Cooling fluid was set to circulating through the passageways 54, 56, 58 and 60 in the walls of the mixing chamber 16, the flow plate 28, the rounded guide member 46 and the receiving end portion of the table 36 to reduce the temperature of these to about 35° F. The prepolymer material and the catalyst material were then pumped through pipes 10 and 12 to the mixing bowl 16 in the ratio of 100 parts by weight of prepolymer to 4.31 parts by weight of the catalyst-water material. Egress of the materials from the mixing bowl 16 was regulated by adjustment of the egress valve 24 so that the material discharged from the mixer 14 was mixed to an extent somewhat less than that desirable for uniform foaming. It was observed that the material immediately at the discharge of the mixer had a viscosity somewhat less than that of the prepolymer alone. Material discharged from the mixer flowed down the rod 26 as a column approximately 1" in diameter surrounding the rod. A given particle of material traveled down the rod 26 in approximately 5 seconds. Some development of viscosity and in opacity or creaminess of the mixture was observed in passage of the material down the rod 26 and down the flow plate 28 onto which the rod discharges the mixture. Movement of a given particle of material down the flow plate 28 took about 15 seconds. Material from the lower edge of the flow plate 28 was deposited on a silicone treated release paper casting sheet 30 which was drawn from the roll 34 along the top of the table 36. Material on the casting sheet 30 is carried to the throat defined between the casting sheet 30 on the table and the blow sheet 42 which was drawn from the roll 44 around the rounded guide member 46 and beneath the doctor bar 48 at the lower edge of the guide member. The space between the converging casting sheet 30 and blow sheet 42 was set at .006". Material on the casting sheet 30 was accumulated in the throat as a rolling bank 52 about ½" in diameter. It was observable that the material in this bank 52 was subjected to a working mixing action in which portions already in the bank, which were picked up at an earlier point in movement of the carrier sheet 30, were thoroughly combined with material freshly picked up from the casting sheet 30. The casting sheet 30 and blow sheet 42 with the uniform layer 50 of material between them were carried forward through the oven 62 in which blowing and curing of the resin layer took place. At the egress end of the oven 62, the blow sheet 42 and carrier sheet 30 were pulled away from the expanded resin sheet around the rollers 41 and 39, respectively, and were coiled up in the rolls 38 and 40 for reuse. The expanded sheet was then subjected to a further curing treatment for two hours at 110° C. to form a strong, light colored elastic foam sheet having good low temperature flexibility. The cell structure was uniform on visual inspection and comprised mainly interconnected cell structure except for a very thin, almost imperceptible skin on both surfaces.

*Example II*

A mixture of reaction product toluene diisocyanate and polypropylene glycol was prepared in accordance with the procedure of Example I and combined with silicone oil and cooled in accordance with the procedure of Example I. 9.4 parts by weight of N-methyl morpholine and 0.65 grams of triethylamine were added to the mixture and thoroughly stirred in.

The mixture of the reaction product, the N-methyl morpholine and triethylamine was deposited in the cooled trough 90 of a knife spreader and a sheet 72 of silicone-treated release paper was drawn beneath the spreader at the rate of about five yards per minute. The blade of the spreader was set to give a coating of .025" in thickness. Directly after the spreader, water was sprayed from the nozzle 76 on the spread layer of material using a needle type spray so that the water penetrated somewhat into the surface of the spread layer. The release paper 72 with the spread layer and water thereon was then pulled beneath the chilled spreader knife 80 which was adjusted heightwise to accumulate a ½" rolling bank of material from the material on the casting sheet 72 and effected a thorough mixing of the components in the rolling bank. The cold spreader knife 80 prevented premature development of gas in the components in the rolling bank. The release paper casting sheet carried a layer of foam-forming mixture of uniform thickness from the spreader knife 80 and this mixture was carried forward into a warming up zone and then into an oven for final blowing and curing. A light impervious blow sheet 82 of silicone treated glassine was laid down on the layer of material spread by a doctor knife. This blow sheet was in free floating relationship on the surface of the layer of resin to prevent loss of blow gas, catalyst, or water vapor and insured that the layer foamed to a uniform cellular material. The blow sheet and the carrier sheet were stripped from the cellular resin sheet and it was found that the surfaces of the foam resin sheet carried a very thin, almost imperceptible skin.

Having thus described our invention, what we claim as new and desire to secure by Letters Patent of the United States is:

1. The method of casting thin, uniform sheets of cellular polyurethane resin comprising the steps of forming on a casting surface a layer of an incomplete mixture of (1) a reaction product of an organic compound having a plurality of active hydrogen groups and an excess over the amount required to react with all of said active hydrogen groups of an organic compound having a plurality of groups of the formula —NCO, (2) water, and (3) catalyst for the reaction between water and said reaction product, providing a delay period of a length to permit partial reaction of said reaction product and water to increase the viscosity of the incomplete mixture without permitting substantial evolution of gas, passing the incomplete mixture of materials on said casting surface through a path of diminishing cross section forming from said materials a rolling bank in said path in which the materials are intimately mixed and from which portions are spread on said casting surface as a layer of uniform thickness, covering the materials on said casting surface with a light, flexible, substantially impervious cover sheet prior to substantial development of gas and raising the temperature of said layer to complete reaction between said reaction product and water to develop gas to expand the layer and to cause it to become firm as a cellular polyurethane resin layer, said cover sheet substantially preventing loss of gaseous and volatile materials and rupture of gas cells at the surface of said layer.

2. The method of casting thin, uniform sheets of cellular polyurethane resin from a combination of reagents including (1) a reaction product of an organic compound having a plurality of active hydrogen groups and an excess over the amount required to react with all of said active hydrogen groups of an organic compound having a plurality of groups of the formula —NCO, (2) water, and (3) a catalyst for the reaction between water and said reaction product, said process including the steps of spreading on a casting surface a thin layer comprising said reaction product and not more than one of the remaining reagents of said combination, depositing on said layer the remainder of said combination to form an incomplete mixture, providing a delay period of a length to permit partial reaction of said reaction product and water to increase the viscosity of the incomplete mixture without permitting substantial evolution of gas, passing the mixture of incomplete materials on said casting surface through a path of diminishing cross section, forming from said materials a rolling bank in said path in which the materials are intimately mixed and from which portions are spread on said casting surface as a layer of uniform thickness, covering the mixture of reagents on said casting sheet with a light, flexible, substantially impervious cover sheet prior to substantial development of gas and raising the temperature of said layer to complete reaction between said reaction product and water to develop gas to expand the layer and to cause it to become firm as a cellular polyurethane resin layer, said cover sheet substantially preventing loss of gaseous and volatile materials and rupture of gas cells at the surface of said layer.

3. The method of casting thin, uniform sheets of cellular polyurethane resin from a combination of reagents including (1) a reaction product of an organic compound having a plurality of active hydrogen groups and an excess over the amount required to react with all of said active hydrogen groups of an organic compound having a plurality of groups of the formula —NCO, and (2) water, the steps of mixing with one of said reagents a catalyst for the reaction between them, spreading on a casting surface a layer comprising said reaction product, spraying said water on said layer to form an incomplete mixture, providing a delay period of a length to permit partial reaction of said reaction product and water to increase the viscosity of the incomplete mixture without permitting substantial evolution of gas, passing the mixture of incomplete materials on said casting surface through a path of diminishing cross section forming from said materials a rolling bank in said path in which the materials are intimately mixed and from which portions are spread on said casting surface as a layer of uniform thickness, covering the materials on said casting surface with a light, flexible, substantially impervious cover sheet prior to substantial development of gas and raising the temperature of said layer to complete reaction between said reaction product and water to develop gas to expand the layer and to cause it to become firm as a cellular polyurethane resin layer, said cover sheet being in free floating relationship on the upper surface of said deposited intermixture thereby allowing full expansion of said intermixture and substantially preventing loss of gaseous and volatile materials and rupture of gas cells at the surface of said layer.

4. The method for casting thin, uniform sheets of cellular resin comprising the steps of forming an incomplete mixture comprising (1) a reaction product of an organic compound having a plurality of active hydrogen groups and an excess over the amount required to react with all of said active hydrogen groups of an organic compound having a plurality of groups of the formula —NCO, (2) water, and (3) a catalyst for the reaction between water and said reaction product, conducting said incomplete mixture along a path providing a delay period of a length to permit partial reaction of said reaction product and water to increase the viscosity of said mixture without permitting substantial evolution of gas, said path leading the mixture to a casting surface without appreciable free drop, passing the incomplete mixture on said casting surface through a path of diminishing cross section, forming from said incomplete mixture a rolling bank in said path in which the components of said incomplete mixture are intimately mixed and from which portions are spread on said casting surface as a layer of uniform thickness, covering the mixture with a substantially impervious cover sheet prior to substantial development of gas, and raising the temperature of said layer to complete reaction between said reaction product and water to develop gas to expand the layer and to cause it to become firm as a cellular resin layer, said cover sheet substantially preventing loss of gaseous and volatile materials and rupture of gas cells at the surface of said layer.

5. The method for casting thin, uniform sheets of cellular resin comprising the steps of forming an incomplete mixture comprising (1) a reaction product of an organic compound having a plurality of active hydrogen groups and an excess over the amount required to react with all of said active hydrogen groups of an organic compound having a plurality of groups of the formula —NCO, (2) water, and (3) a catalyst for the reaction between water and said reaction product, said mixture being at a temperature below the temperature at which said reaction product and water will combine to produce gas at a significant rate, the temperature being sufficiently high that said mixture has a spreadable viscosity, conducting said incomplete mixture along a path providing a delay period of a length to permit partial reaction of said reaction product and water to increase the viscosity of said mixture without permitting substantial evolution of gas, said path leading the mixture to a casting surface without appreciable free drop, passing the cool, incomplete mixture on said casting surface through a path of diminishing cross section defined by said casting surface and a chilled surface inclined at an angle to said casting surface, forming from said incomplete mixture a rolling bank between said spreading and mixing surface and said casting surface in which the components of said incomplete mixture are intimately mixed and from which portions are spread on said casting surface as a layer of uniform thickness, covering the mixture with a light, flexible, substantially impervious cover sheet prior to substantial development of gas, raising the temperature of said layer to complete reaction between said reaction product and water to develop gas to expand the layer and to cause it to become firm as a cellular resin layer, said cover sheet being in free floating relationship on the upper surface of said layer thereby allowing full expansion of said layer and substantially preventing loss of gaseous and volatile materials and rupture of gas cells at the surface of said layer.

6. The method for casting thin, uniform sheets of cellular resin, said method comprising the steps of cooling a reaction product of an organic compound having a plurality of active hydrogen groups and an excess over the amount required to react with all of said active hydrogen groups of an organic compound having a plurality of groups of the formula —NCO, said cooling reducing the temperature of said reaction product below the temperature at which it will combine with water to produce gas at a significant rate, the temperature being sufficiently high that a mixture of said reaction product and water will have a spreadable viscosity, incompletely mixing said cooled reaction product, water and a catalyst for the reaction between water and the reaction product, moving the resultant cool, incomplete mixture along a path providing a delay period of a length to permit partial reaction of said reaction product and water to increase the viscosity of the mixture without permitting substantial evolution of gas, said path leading the mixture to a substantially impervious casting surface without appreciable free drop, passing the incomplete mixture on said casting surface through a path of diminishing cross section, said path being defined by said casting surface and a chilled spreader surface inclined at an angle to said casting surface, the edge of said spreader surface closest to said supporting surface being in predetermined spaced relation to said supporting surface to spread the mixture in a layer of uniform thickness on said casting surface, forming from said incomplete mixture a rolling bank between said spreading and mixing surface and said casting surface in which the components of said incomplete mixture are intimately mixed, covering the mixture with a light, flexible, substantially impervious cover sheet prior to substantial development of gas, raising the temperature of said layer to complete reaction between said reaction product and water to develop gas to expand the layer and to cause it to become firm as a cellular resin layer, said cover sheet being in free floating relationship on the upper surface of said layer thereby allowing full expansion of said layer and substantially preventing loss of gaseous and volatile materials and rupture of gas cells at the surface of said layer.

7. The continuous method for casting thin, uniform sheets of cellular resin, said method comprising the steps of cooling a reaction product of an organic compound having a plurality of active hydrogen groups and an excess over the amount required to react with all of said active hydrogen groups of an organic compound having a plurality of groups of the formula —NCO, said cooling reducing the temperature of said reaction product below the temperature at which it will combine with water to produce gas at a significant rate, the temperature being sufficiently high that a mixture of said reaction product and water will have a spreadable viscosity, continuously supplying to a mixing zone said cooled reaction product, water and a catalyst for the reaction between water and the reaction product, continuously incompletely mixing said reaction product, water and catalyst, continuously passing the resultant cool, incomplete mixture along a path providing a delay period of a length to permit partial reaction of said reaction product and water to increase the viscosity of the mixture without permitting substantial evolution of gas, said path leading the mixture to a moving substantially impervious casting surface without appreciable free drop, carrying the incomplete mixture on said casting surface through a path of diminishing cross section, said path being defined by said casting surface and a chilled blow sheet moving at the speed of the casting surface along a path sloping toward said casting surface, the line of closest approach of said blow sheet to said casting surface being in predetermined spaced relation to said supporting surface to spread said deposited mixture as a layer of uniform thickness on said casting surface, forming from said mixture a rolling bank between said blow sheet and said casting surface in said path of diminishing cross section in which freshly deposited material and material previously accumulated between said blow sheet and said supporting surface are intimately mixed, moving said blow sheet along with said layer and supporting sheet, raising the temperature of said layer to complete reaction between said reaction product and water to develop gas to expand the intermixture and to cause it to become firm as a cellular resin layer, said blow sheet being in free floating relationship on the upper surface of said deposited intermixture thereby allowing full expansion of said intermixture and substantially preventing loss of gaseous and volatile materials and rupture of gas cells at the surface of said deposited material.

References Cited in the file of this patent

UNITED STATES PATENTS

| | | |
|---|---|---|
| Re. 24,514 | Hoppe et al. | Aug. 12, 1958 |
| 2,500,728 | Williams | Mar. 14, 1950 |
| 2,590,186 | Land | Mar. 25, 1952 |
| 2,770,241 | Winkler | Nov. 13, 1956 |
| 2,841,205 | Bird | July 1, 1958 |
| 2,889,291 | Moore | June 2, 1959 |